US009231684B2

(12) United States Patent
Nammi

(10) Patent No.: US 9,231,684 B2
(45) Date of Patent: Jan. 5, 2016

(54) FINDING CHANNEL STATE INFORMATION WITH REDUCED CODEBOOK IN A MULTI-ANTENNA WIRELESS COMMUNICATION SYSTEM

(71) Applicant: TELEFONAKTIEBOLAGET L M ERICSSON (PUBL), Stockholm (SE)

(72) Inventor: Sairamesh Nammi, Kista (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 0 days.

(21) Appl. No.: 14/697,143

(22) Filed: Apr. 27, 2015

(65) Prior Publication Data

US 2015/0229381 A1 Aug. 13, 2015

Related U.S. Application Data

(62) Division of application No. 13/610,319, filed on Sep. 11, 2012, now Pat. No. 9,048,908.

(51) Int. Cl.
*H04B 7/06* (2006.01)

(52) U.S. Cl.
CPC .............. *H04B 7/0639* (2013.01); *H04B 7/063* (2013.01); *H04B 7/0626* (2013.01); *H04B 7/0634* (2013.01)

(58) Field of Classification Search
CPC .. H04B 7/0456; H04B 7/0486; H04B 7/0639; H04B 7/0417; H04B 7/0626
See application file for complete search history.

(56) References Cited

U.S. PATENT DOCUMENTS

| 2009/0323840 | A1 | 12/2009 | Lee et al. |
| 2010/0118997 | A1* | 5/2010 | Lee et al. ............... 375/260 |
| 2011/0268204 | A1 | 11/2011 | Choi et al. |
| 2012/0076028 | A1 | 3/2012 | Ko et al. |
| 2012/0120997 | A1 | 5/2012 | Park et al. |
| 2013/0315284 | A1 | 11/2013 | Nammi |
| 2014/0064393 | A1 | 3/2014 | Sun et al. |

FOREIGN PATENT DOCUMENTS

| EP | 2 568 646 A1 | 3/2013 |
| WO | WO 2011/137595 A1 | 11/2011 |
| WO | WO 2013/068916 A1 | 5/2013 |
| WO | WO 2011/121499 A2 | 10/2013 |

OTHER PUBLICATIONS

UTRA-UTRAN Long Term Evolution (L TE) and 3GPP System Architecture Evolution (SAE), Long Term Evolution of the 3GPP radio technology, 8 pages. Oct. 4, 2006.

(Continued)

*Primary Examiner* — Curtis Odom

(57) ABSTRACT

According to certain embodiments, a method performed by a transmitter to provide a precoder subset to a receiver in a multi-antenna wireless communication system is disclosed. The method includes determining the precoder subset comprising one or more precoder elements, each precoder element being a precoder element of a codebook, and the precoder subset including less than all precoder elements of the codebook. The method further includes providing the precoder subset to the receiver, wherein the codebook is defined for a plurality of ranks. For each rank, the codebook comprises a plurality of precoder elements corresponding to that rank.

12 Claims, 11 Drawing Sheets

(56) References Cited

OTHER PUBLICATIONS

Krishna K. Mukkavilli et al., "Design of Multiple Antenna Coding Schemes with Channel Feedback", Rice University, Houston, Texas, pp. 1009-1013. Nov. 4-7, 2001.

David J. Love et al., "Quantized Antenna Weighting Codebook Design for Multiple-Input Multiple-Output Wireless Systems", The University of Texas at Austin, Austin, Texas & University of California (Davis), Davis, California, 2 pages. 2002.

International Search Report and Written Opinion mailed Mar. 2, 2014 in International Application No. PCT/EP2013/068378 (11 pages total).

3GPP TS 25.212 V11.3.0, 3rd Generation Partnership Project; Technical Specification Group Radio Access Network; Multiplexing and channel coding (FDD) (Release 11), Sep. 2012 (135 pages).

3GPP TS 36.213 V11.0.0, 3rd Generation Partnership Project; Technical Specification Group Radio Access Network; Evolved Universal Terrestrial Radio Access (E-UTRA); Physical layer procedures (Release 11), Sep. 2012 (143 pages).

R1-125359; 3GPP TSG-RAN WG1 Meeting #71, New Orleans, Louisiana, USA, Nov. 12-16, 2012, Change Request (36 pages).

International Search Report and Written Opinion with transmittal sheet mailed Feb. 7, 2014 in corresponding International Application No. PCT/EP2013/063683 (11 pages total).

Inventor: Sairamesh Nammi, U.S. Appl. No. 13/748,212, filed Jan. 23, 2013, "Finding Channel State Information With Reduced Codebook in a Multi-Antenna Wireless Communication System".

I. Emre TELA TAR, "Capacity of Multi-antenna Gaussian Channels", ATT Bell Laboratories, Tech. Memo., Jun. 1995, 28 pages.

Anna Scaglione et al., "Optimal Designs for Space-Time Linear Precoders and Decoders", IEEE Transactions on Signal Processing, vol. 50, No. 5, May 2002, pp. 1051-1064.

Hemanth Samp A TH et al., "Generalized Linear Precoder and Decoder Design for MIMO Channels Using the Weighted MMSE Criterion", IEEE Transactions on Communications, vol. 49, No. 12, Dec. 2001, pp. 2198-2206.

\* cited by examiner

US 9,231,684 B2

FINDING CHANNEL STATE INFORMATION WITH REDUCED CODEBOOK IN A MULTI-ANTENNA WIRELESS COMMUNICATION SYSTEM

RELATED APPLICATIONS

This application is a divisional of co-pending U.S. patent application Ser. No. 13/610,319 filed on Sep. 11, 2012 the disclosure of which is incorporated herein by reference in its entirety.

TECHNICAL FIELD

The technical field of the present disclosure generally relates to a receiver in a wireless communication system providing feedback to a transmitter. In particular, the technical field relates to methods, apparatuses, and/or systems for using a with reduced codebook in a multi-antenna wireless communication system to find channel state information. The reduced codebook allows the receiver's complexity to be reduced when providing feedback to a transmitter.

BACKGROUND

Multiple antennas employed at the transmitter and receiver can significantly increase the system capacity. By transmitting independent symbol streams in the same frequency bandwidth, usually referred to as spatial multiplexing (SM), achieves a linear increase in data rates with the increased number of antennas. On the other hand, by using space-time codes at the transmitter, reliability of the detected symbols can be improved by exploiting transmit diversity. Both schemes assume no channel knowledge at the transmitter.

However, in a practical wireless systems such as the 3GPP (3rd Generation Partnership Project) LTE (Long Term evolution), HSDPA (High Speed Downlink Packet Access) and WiMAX (Worldwide Interoprability for Microwave Access) systems, the channel knowledge can be made available at the transmitter via feedback from the receiver to the transmitter. A MIMO (Multiple Input Multiple Output) transmitter can utilize this channel information to improve the system performance with the aid of precoding. In addition to beam forming gain, the use of precoding avoids the problem of ill-conditioned channel matrix.

In practice, complete CSI (channel state information) may be available for a communication system using TDD (time division duplex) scheme by exploiting channel reciprocity. However, for a FDD (frequency division duplex) system, complete CSI is more difficult to obtain. In a FDD system, some kind of CSI knowledge may be available at the transmitter via feedback from the receiver. These systems are called limited feedback systems. There are many implementations of limited feedback systems such as codebook based feedback and quantized channel feedback. 3GPP LTE, HSDPA and WiMAX recommend codebook based feedback CSI for precoding.

In a codebook based precoding, predefined codebook is defined both at transmitter and receiver. The entries of codebook can be constructed using different methods such as Grassmannian, Lyod algorithm, DFT matrix etc. The precoder matrix is often chosen to match the characteristics of the $N_R \times N_T$ MIMO channel matrix H ($N_R$ being the number of receive antennas and $N_T$ being the number of transmit antennas), resulting in a so called channel dependent precoding. This is also commonly referred to as closed-loop precoding and essentially strives for focusing the transmit energy into a signal subspace which is strong in the sense of conveying much of the transmitted energy to the UE (user equipment). The signal subspace in this context is a subspace of a signal space that is defined in any number of dimensions including space, time, frequency, code, etc.)

In addition, the precoder matrix may also be selected to strive for orthogonalizing the channel, meaning that after proper linear equalization at the UE, the inter-layer interference is reduced. At the receiver, it is common to find SINR (signal-to-interference-plus-noise ratio) with different codebook entries and choose the rank/precoding index which gives the highest spectral efficiency (also referred to as channel capacity). In this context, rank indicates the number of data streams that can be simultaneously transmitted from a transmitter to a receiver.

The performance of a closed-sloop MIMO system generally improves with the cardinality (size) of the codebook set. At the receiver, RI (rank information) and PCI (precoding control index) are sent back to the transmitter every TTI (transmission time interval) or multiples of TTI (for example 5 in LTE, 1/3 in HSDPA). In general, finding the rank information and precoding control index is cumbersome and involves many computations. The complexity is huge in case of a closed-sloop MIMO when the codebook is large. For example, HSDPA/LTE defines a codebook for a 4-Tx antennas system with 64 codewords (16 codewords per rank). As the number of antennas increase, the complexity can increase exponentially. This makes it difficult to implement conventional methods of providing feedback to improve performance.

SUMMARY

A non-limiting aspect of the disclosed subject matter is directed to a method performed by a receiver to provide channel state information as feedback to a transmitter in a multi-antenna wireless communication system. The method may comprise estimating a channel between the transmitter and the receiver and determining a precoder subset. The precoder subset may comprise one or more precoder elements, each of which may be a precoder element of a codebook defined for a plurality of ranks. For each rank, the codebook may comprise a plurality of precoder elements corresponding to that rank. The precoder subset may include less than all precoder elements of the codebook. The method may also comprise determining a capacity corresponding to each precoder element in the precoder subset. The method may further comprise determining the channel state information associated with the precoder element whose corresponding capacity is maximum among the capacities corresponding to the precoder elements of the precoder subset. The method may yet further comprise and providing the channel state information to the transmitter as the feedback. The channel state information may include rank information and precoding control index.

Another non-limiting aspect of the disclosed subject matter is directed to a computer-readable medium which includes therein programming instructions. When a computer executes the programming instructions, the computer executes the method performed in a receiver to provide channel state information as feedback to a transmitter in a multi-antenna wireless communication system as described above.

Another non-limiting aspect of the disclosed subject matter is directed to a receiver of a multi-antenna wireless communication system in which the receiver may be structured to provide channel state information as feedback to a transmitter. The receiver may comprise a channel estimator, a precoder subset determiner, a capacity determiner, a channel state determiner, and a feedback provider. The channel estimator may be structured to estimate a channel between the transmitter and the receiver. The precoder subset determiner may be structured to determine a precoder subset which may comprise one or more precoder elements, each of which may be a precoder element of a codebook defined for a plurality of ranks. For each rank, the codebook may comprise a plurality of precoder elements corresponding to that rank. The precoder subset may include less than all precoder elements of the codebook. The capacity determiner may be structured to determine, for each precoder element in the precoder subset, a capacity corresponding to that precoder element based on the channel estimation. The channel state determiner may be structured to determine the channel state information associated with the precoder element whose corresponding capacity is maximum among the capacities corresponding to the precoder elements of the precoder subset. The feedback provider may be structured to provide the channel state information to the transmitter as the feedback. The channel state information may include rank information and precoding control index.

Another non-limiting aspect of the disclosed subject matter is directed to a method performed by a transmitter to provide a procoder subset to a receiver in a multi-antenna wireless communication system. The method may comprise determining a precoder subset which may comprise one or more precoder elements, each of which may be a precoder element of a codebook defined for a plurality of ranks. For each rank, the codebook may comprise a plurality of precoder elements corresponding to that rank. The precoder subset may include less than all precoder elements of the codebook. The method may also comprise providing the precoder subset to the receiver.

Another non-limiting aspect of the disclosed subject matter is directed to a computer-readable medium which includes therein programming instructions. When a computer executes the programming instructions, the computer executes the method performed in a transmitter to provide the precoder subset to a receiver in a multi-antenna wireless communication system as described above.

Another non-limiting aspect of the disclosed subject matter is directed to a transmitter of a multi-antenna wireless communication system in which the transmitter may be structured to provide precoder subset to a receiver. The transmitter may comprise a precoder subset provider structured to determine a precoder subset which may comprise one or more precoder elements, each of which may be a precoder element of a codebook defined for a plurality of ranks. For each rank, the codebook may comprise a plurality of precoder elements corresponding to that rank. The precoder subset may include less than all precoder elements of the codebook. The capacity determiner may be structured to determine, for each precoder element in the precoder subset, a capacity corresponding to that precoder element based on the channel estimation. The precoder subset provider may also be structured to provide the precoder subset to the receiver.

DESCRIPTION OF THE DRAWINGS

The foregoing and other objects, features, and advantages of the disclosed subject matter will be apparent from the following more particular description of preferred embodiments as illustrated in the accompanying drawings in which reference characters refer to the same parts throughout the various views. The drawings are not necessarily to scale.

DETAILED DESCRIPTION

Figure 1:
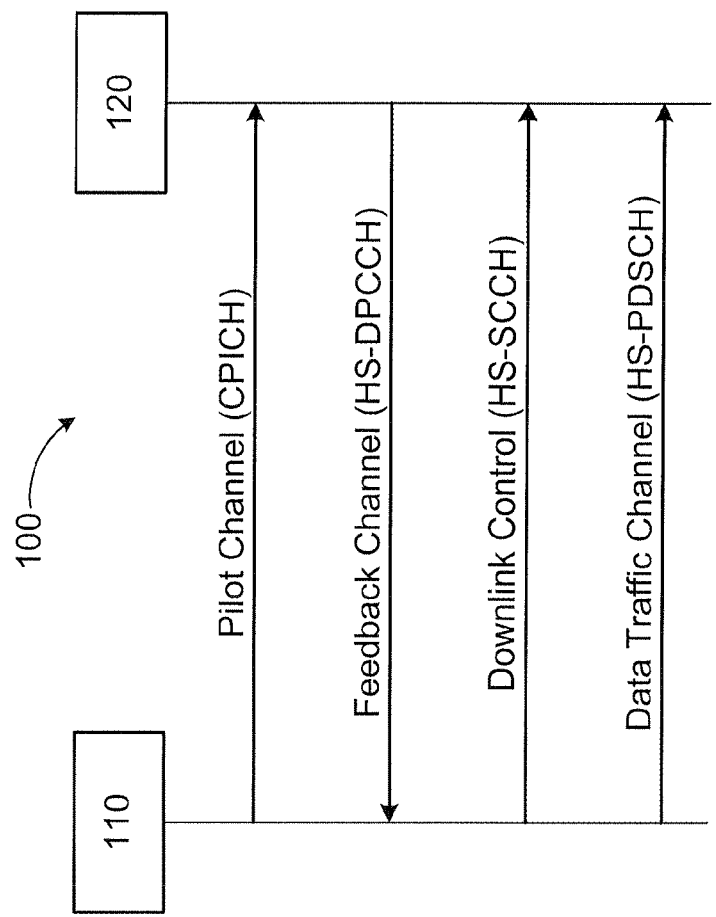
FIG. 1 illustrates an example of messages exchanged between a transmitter and a receiver during a typical call set up.

For purposes of explanation and not limitation, specific details are set forth such as particular architectures, interfaces, techniques, and so on. However, it will be apparent to those skilled in the art that the technology described herein may be practiced in other embodiments that depart from these specific details. That is, those skilled in the art will be able to devise various arrangements which, although not explicitly described or shown herein, embody the principles of the described technology.

In some instances, detailed descriptions of well-known devices, circuits, and methods are omitted so as not to obscure the description with unnecessary details. All statements herein reciting principles, aspects, embodiments and examples are intended to encompass both structural and functional equivalents. Additionally, it is intended that such equivalents include both currently known equivalents as well as equivalents developed in the future, i.e., any elements developed that perform same function, regardless of structure.

Thus, for example, it will be appreciated that block diagrams herein can represent conceptual views of illustrative circuitry embodying principles of the technology. Similarly, it will be appreciated that any flow charts, state transition diagrams, pseudo code, and the like represent various processes which may be substantially represented in computer readable medium and executed by a computer or processor, whether or not such computer or processor is explicitly shown.

Functions of various elements including functional blocks labeled or described as "processors" or "controllers" may be provided through dedicated hardware as well as hardware capable of executing associated software. When provided by a processor, functions may be provided by a single dedicated processor, by a single shared processor, or by a plurality of individual processors, some of which may be shared or distributed. Moreover, explicit use of term "processor" or "controller" should not be construed to refer exclusively to hardware capable of executing software, and may include, without limitation, digital signal processor (shortened to "DSP") hardware, read only memory (shortened to "ROM") for storing software, random access memory (shortened to RAM), and non-volatile storage.

In this document, 3GPP terminologies—e.g., HSDPA, WCDMA, LTE, LTE-A—are used as examples for explanation purposes. Note that the technology described herein can be applied to non-3GPP standards, e.g., WiMAX, UMB, GSM, cdma2000, 1xEVDO, Wireless LAN, WiFi, etc. Thus, the scope of this disclosure is not limited to the set of 3GPP wireless network systems and can encompass many domains of wireless communication systems. Also, a wireless terminal (e.g., UE, laptop, PDA, smart phone, mobile terminal, etc.) will be used as an example of a receiver in which the described method can be performed. That is, the descriptions generally will focus on the downlink transmissions. However, the subject matter is equally applicable to uplink transmissions. That is, the disclosed subject matter is applicable to any node of the network including base stations (e.g., RBS, NodeB, eNodeB, eNB, etc.) and relay stations that receive wireless signals.

As indicated above, finding the rank information and precoding index is cumbersome and involves many computations. For a closed-loop MIMO system, the complexity can be daunting when the codebook is large. For example, HSDPA/LTE defines a codebook for a 4-antennas system with 64 codewords (16 codewords per rank). In this description, the size of the codebook will be referred to by the number of codewords in the codebook. Thus, the size of the HSDPA/LTE codebook for the four branch MIMO system is 64.

In an aspect of the disclosed subject matter, an approach to reduce the computational complexity at the receiver is proposed. In this aspect, the proposed approach avoids full space search and uses a subset of the codebook for finding the channel state information such as rank information, precoding control index, channel quality indicator, and so on. Simulation results show that performance degradation with the proposed approach is very small relative to that achieved by the full space search. Also, the complexity can be greatly reduced.

Ideal linear precoding requires full CSI at the transmitter. This may be possible for TDD based systems, but is not practical for FDD based systems. Codebook based precoding allows the receiver to explicitly identify a precoding matrix/vector based on a codebook that should be used for transmission.

In 3GPP's HSDPA/LTE standard, separate codebooks are defined for various combinations of the number of transmit antennas and the number of transmission layers. The latter is also referred to as rank information (RI). As indicated above for example, for a four branch MIMO system, a total 64 precoding vectors and matrices are defined. Also for each rank in the codebook for the scenarios of RI=1, 2, 3, 4, sixteen (16) precoder elements per rank are defined. The 3GPP standard does not specify what criteria the UE should use to compute the RI and/or the optimum precoding matrices/vectors.

FIG. 1 illustrates an example of messages exchanged between two nodes—a transmitter 110 and a receiver 120—of a multi-antenna wireless communication system 100. In the downlink, the transmitter 110 may be a base station (e.g., Node B) and the receiver 120 may be a wireless terminal (e.g., a UE). In this example, the messages exchanged between a Node B and a UE during a typical call set up are illustrated. From signals transmitted by the Node B on a common pilot channel (CPICH), the UE estimates the channel and computes the channel quality information and precoding channel indicator. The UE reports this information along with hybrid ARQ ACK/NAK to the Node B as feedback on a feedback channel (e.g., HS-DPCCH). The periodicity of HS-DPCCH is typically one subframe (2 msec). For example, once the UE decides about the RI and the corresponding PCI, the information is sent to Node B via the feedback channel.

Upon receiving the feedback information, the Node B decides the rank, modulation, transport block size, and the PCI for the data traffic. This information is conveyed through a downlink control channel (e.g., HS-SCCH). After transmitting the control information to the UE, the Node B then transmits the downlink data to the UE on a data traffic channel (e.g., HS-PDSCH).

As indicated above, the Node B is the data transmitter and the UE is the data receiver in the downlink. Note that in the uplink, the roles are reversed. That is, the Node B is the receiver and the UE is the transmitter. It should be noted that some or all aspects of the described subject matter are equally applicable in the uplink.

Figure 2:
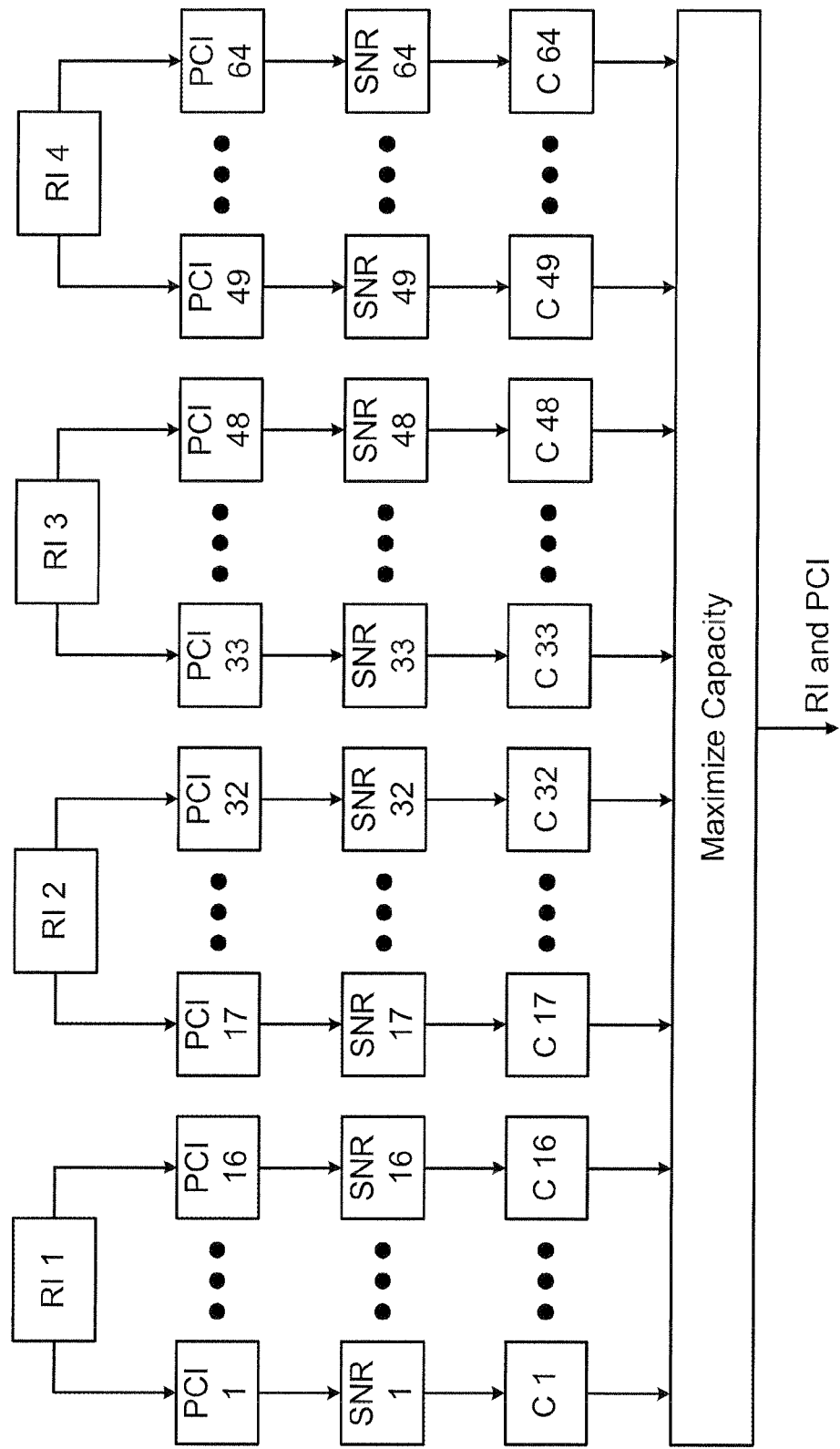
FIG. 2 pictorially illustrates a conventional algorithm for finding rank information and precoding control index for a four branch MIMO system.

FIG. 2 pictorially illustrates a conventional algorithm for finding RI and PCI for a four branch MIMO system. In the conventional approach, the precoding codebook (or simply codebook) contains a total of 64 precoder elements (16 elements for each rank). The received SNR at the output of the MIMO detector (MMSE, MLD etc.) is a function of the channel matrix H, the precoding matrix, the noise power spectral density and the co-channel interference power. The conventional algorithm for finding the RI and PCI consists of the following steps performed by the receiver, e.g., by the UE in the downlink:

Compute channel coefficients by estimating the channel based on the signals on the common pilot channel;
Compute capacity of each codebook element for all elements in the codebook;
Find the PCI and the RI corresponding to the codebook element that maximizes the capacity.

Referring to FIG. 2 specifically, the receiver computes 64 capacities (C1 to C64), one corresponding to each codebook element in the codebook, based on the channel estimation. In other words, an exhaustive search is performed. If the receiver determines that C48 is the highest, then the receiver would provide RI 3 and PCI 48 as feedback to the transmitter.

It can be seen that the exhaustive search of the conventional algorithm involves many computations. As the number of antennas increase, the number of codebook elements can increase exponentially. Thus, it may become impossible, or at least impractical, to implement the exhaustive search called for by the conventional algorithm as the MIMO systems become more complex.

But in an aspect, an approach is proposed which takes less number of computations to determine the CSI (e.g., RI, PCI, CQI, SINK, etc.) with little to no sacrifice in performance as compared to the conventional exhaustive approach. In general, the computation reduction is achieved by the proposed approach through computing the capacities of only a subset of the codebook elements, i.e., less than all codebook elements are considered. But reducing the search space implies that some precoder elements will not be considered. Thus, it is possible that the best precoder element will not be included in the precoder subset, meaning that performance can degrade with the reduced search space relative to the conventional exhaustive search. However, by intelligently choosing the codebook elements to be included in the search space, performance sacrifice can be kept to a minimum, while at the same time reducing complexity.

In a MIMO system, the codebook of the system may be defined for a plurality of ranks, and the codebook may include a plurality of precoder elements for each rank. In such a system, the search space can be reduced by reducing the search space of one or more ranks. Within a rank, there are a total of N precoder elements, and n of the precoder elements within the rank may be considered, i.e., that n out of N precoder elements of that rank are selected or otherwise chosen and their corresponding capacities are computed. When n=N for a rank, this equates to performing a rank exhaustive search for that rank. The conventional exhaustive search then can be equated with performing the rank exhaustive search for all ranks in the codebook.

But in the proposed approach, the search space is reduced for at least one rank, i.e., n<N meaning that less than all precoder elements of that rank are considered. By reducing the search space of considered precoder elements for one or more ranks, the search space as a whole can be reduced relative to the conventional exhaustive search. For ease of expression, the search space of the proposed approach is reflected in a precoder subset. The precoder subset can include one or more precoder elements, each of which is a precoder element of the codebook. When n<N for at least one rank, then the precoder subset includes less than all elements of the codebook. In the proposed approach, the precoder subset can be determined, the capacities corresponding to the precoder elements in the precoder subset can be determined, and the channel state information of the precoder element with best capacity among the precoder elements of the precoder subset can be used to decide on the transmission parameters for data traffic at the transmitter. When the search space is reduced, the complexity is also desirably reduced since fewer computations are required.

Figure 3:
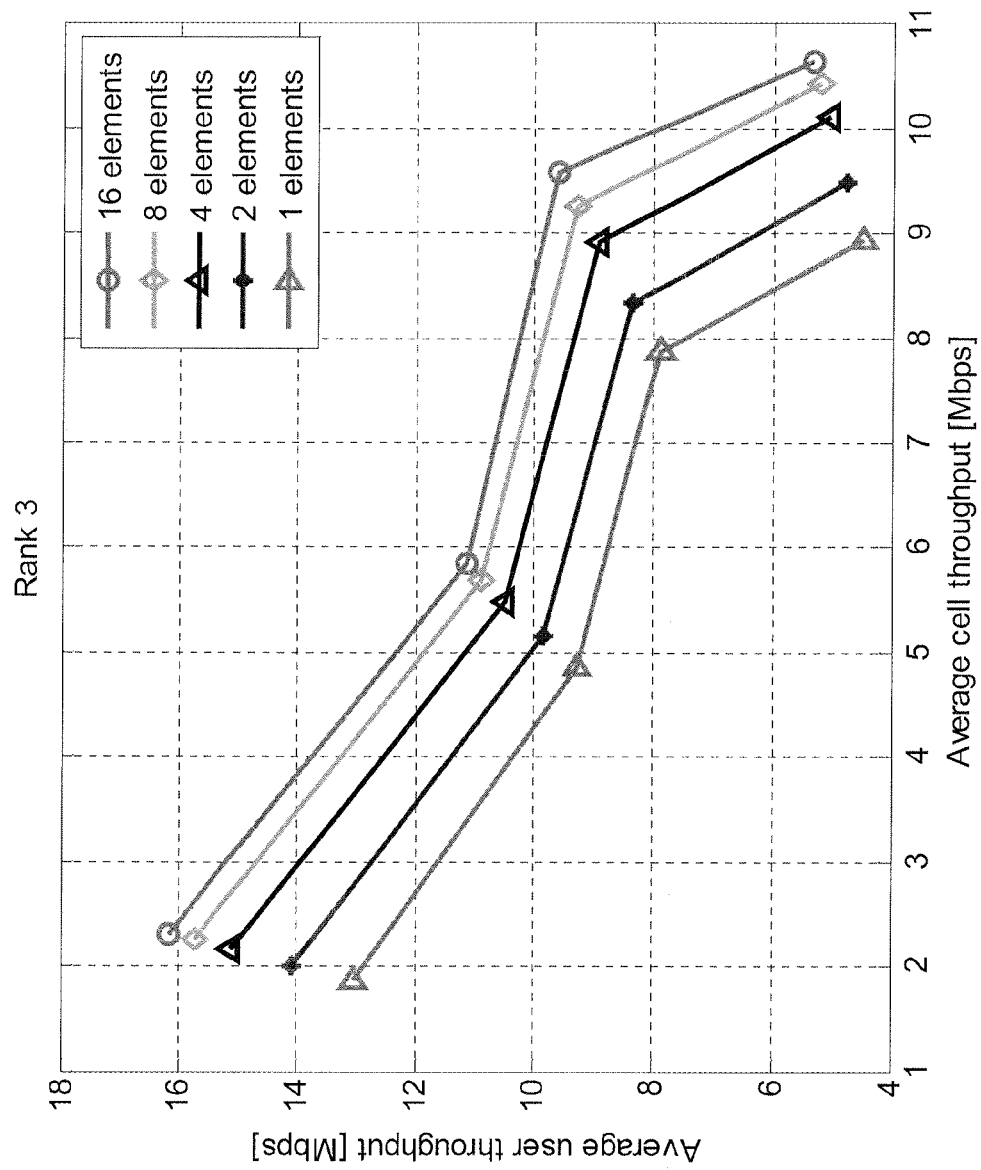
FIG. 3 graphically illustrates an example of average user throughput vs. average cell throughput for various number of precoder elements in rank 3 only transmissions.

Regarding the potential for performance degradation, the inventor of the disclosed subject matter observed that as the rank is increased, the performance loss does not become noticeable until the number of elements is decreased to a greater degree. FIG. 3 illustrates a graph of a comparison of an average user throughput vs. an average cell throughput for various number of precoder elements for rank 3 (RI=3) only transmissions for a four branch MIMO system. The number of precoder elements n considered and graphed are n=1, 2, 4, 8, 16. In this figure, when n<N=16, the n precoder elements were chosen at random. As seen, when the search space is halved to n=8, the performance loss is about 2% relative to the rank exhaustive search n=N=16. This indicates that for rank 3 communications, the search space can be reduced by a factor of two without a significant performance loss.

Figure 4:
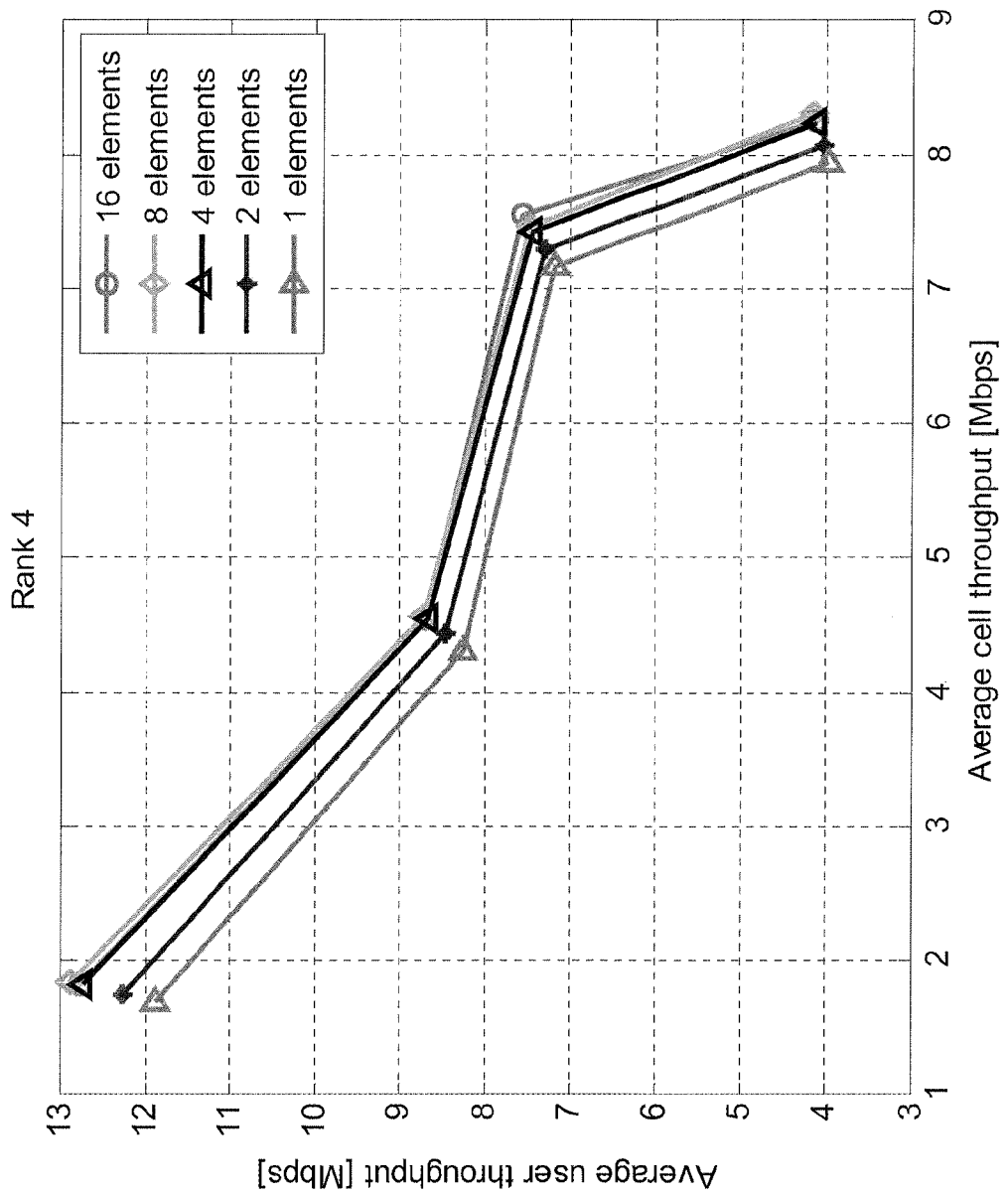
FIG. 4 graphically illustrates an example of average user throughput vs. average cell throughput for various number of precoder elements in rank 4 only transmissions.

FIG. 4 is similar to FIG. 3 except that the comparisons are graphed for rank 4 (RI=4) only transmissions. As seen, the performance lines representing n=8 and n=4 (again precoder elements being randomly chosen) more or less coincide with the performance line representing the rank exhaustive search n=N=16. Also as seen, even when n=2, i.e., when only two randomly chosen elements are considered, the performance loss is still less than 2%. This indicates that for rank 4 communications, the search space can be reduced by a factor of four with substantially no loss in performance, and can be reduced by a factor of eight if a performance loss of 2% can be tolerated.

One would expect that within any particular rank, the best performance is achieved when the rank exhaustive search is performed, i.e., when n=N. But when only a subset of the precoder elements are considered, i.e., when n<N, there is a chance that the precoder element with the actual best capacity within that rank may not be chosen. Thus, on average, one would also expect that the throughput performance when n<N will be below that of the exhaustive search, and that the throughput loss will increase as n decreases. FIGS. 3 and 4 both confirm these expectations.

FIGS. 3 and 4 also confirm the observation the inventor of the disclosed subject matter has made—that for higher ranks, performance loss does not become noticeable until the number of elements is decreased to a greater degree. For example, if a performance degradation of 2% can be tolerated, then the search space for rank 4 transmissions can be reduced by a factor of eight (n=2), but should not be reduced by more than a factor of two (n=8) for rank 3. This indicates that the size of the search space can inversely correspond with the rank.

Note that the reduction in search space, and hence reduction in complexity, can depend on the tolerance for performance loss. For example, if the potential performance loss greater than 2% can be tolerated, then the search space could perhaps be reduced by a factor of sixteen (n=1) for rank 4 communications and by a factor of four (n=4) for rank 3.

For lower rank transmissions, e.g., rank 2 (or even for rank 1), it is possible to reduce the search space, i.e., consider less than all codebook elements n<N. However, the tradeoff of reducing the computational complexity by reducing the search space at the cost of potential performance loss may not be worthwhile. So for lower ranks, e.g., for ranks at or below a rank threshold, it may be desirable that the search space includes all precoder elements, e.g., include all precoder elements of the lower ranks in the precoder subset. But again, this is not a strict limitation.

Figure 5:
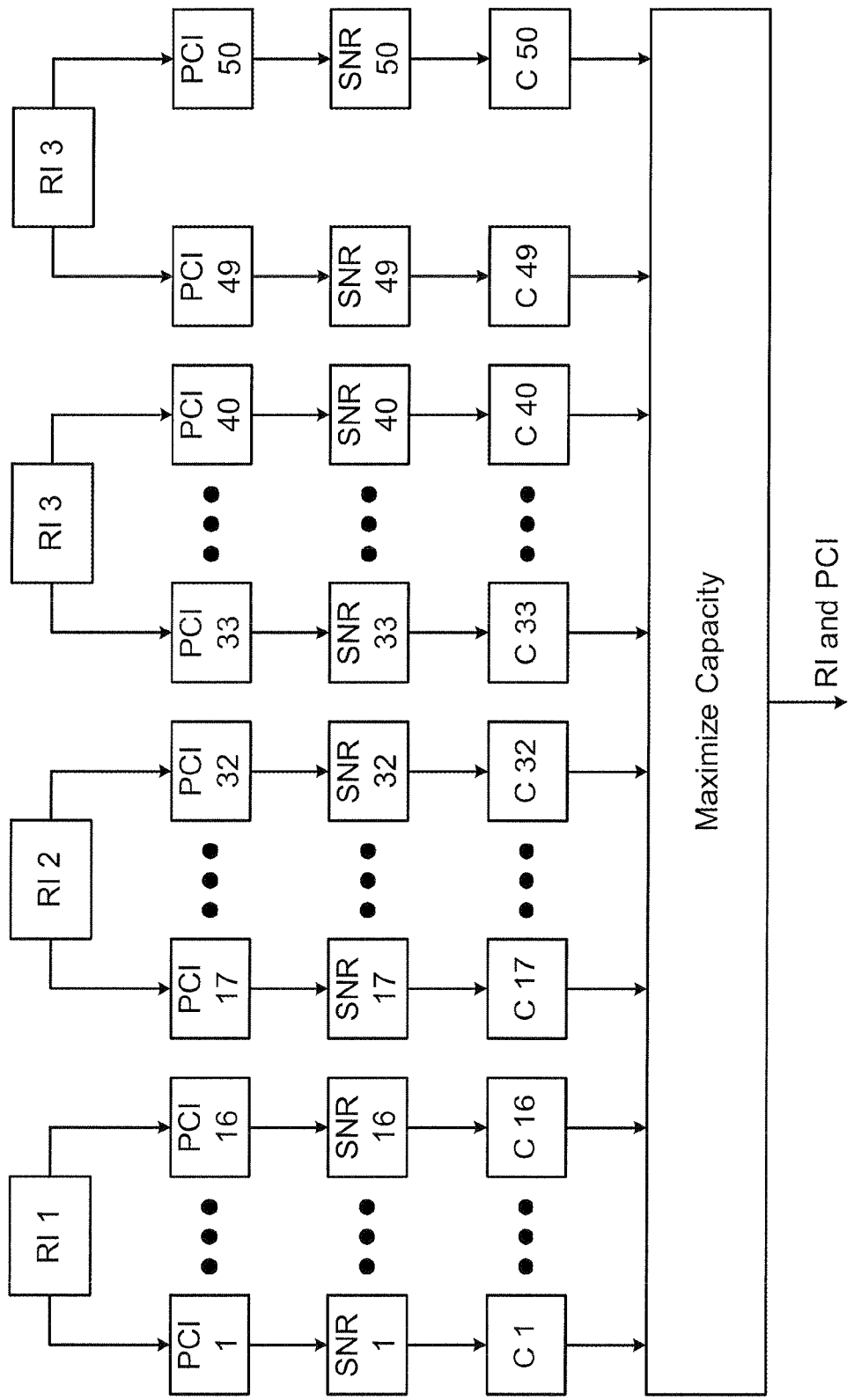
FIG. 5 pictorially illustrates an example of a proposed algorithm for finding rank information and precoding control index for an example MIMO system.

FIG. 5 pictorially illustrates an example of a proposed algorithm for finding rank information and precoding control index for a four branch MIMO system. In this figure, it is assumed that an average of 2% throughput loss is acceptable. Recall that the total search space of the conventional exhaustive search is size 64 (n=16 for each of ranks 1, 2, 3 and 4). See FIG. 2. But in this example in which the proposed approach is applied, the search space is reduced to size 42 (n=16 for rank 1, n=16 for rank 2, n=8 for rank 3, n=2 for rank 4). See FIG. 5. Then the RI, PCI, CQI, etc. corresponding to the best capacity among the 42 computed capacities are provided as feedback information.

In this particular example, the overall reduction factor is 64:42, i.e., the complexity is reduced by a factor of roughly 3:2. However, as the number of antennas increase (e.g., to 8, 16, or more), the reduction in the search space could become more and more significant.

FIG. 5 shows that capacities C33-C40 are computed for rank 3, and capacities C49 and C50 are computed for rank 4. However, this is merely one possibility. Any eight among the capacities C33-C48 may be computed for rank 3, and any two among the capacities C49-C64 may be computed for rank 4. The corresponding precoder elements may be selected at random at the receiver 120, may be internally defined within the receiver 120, and/or the transmitter 110 may specify the precoder elements for consideration to the receiver 120.

Figure 6:
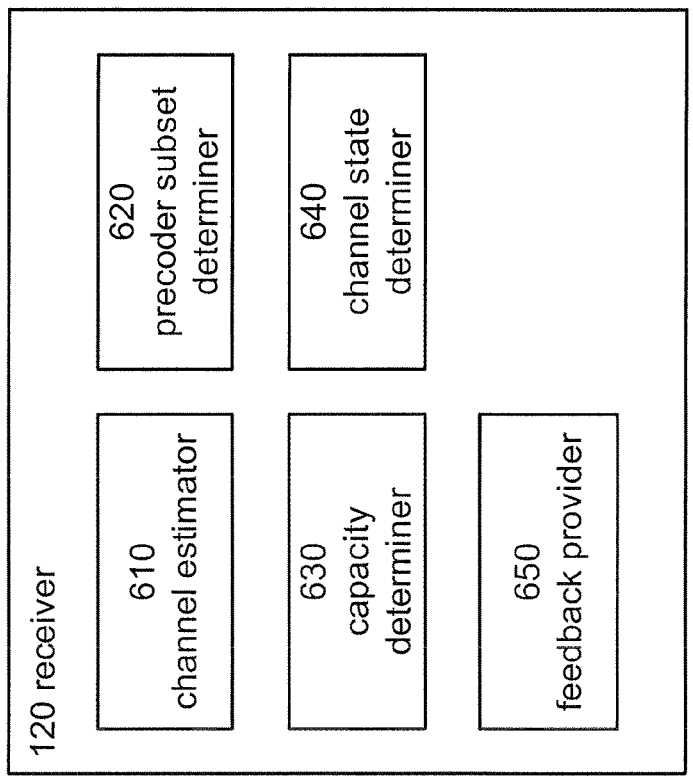
FIG. 6 illustrates an embodiment of a receiver of a wireless network structured to provide channel state information to a transmitter.

FIG. 6 illustrates an embodiment of a receiver 120 of a multi-antenna wireless network 100 that is structured to provide channel state information as feedback to a transmitter 110 in accordance with an example of the proposed approach. As seen, the receiver 120 may include a channel estimator 610, a precoder subset determiner 620, a capacity determiner 630, a channel state determiner 640 and a feedback provider 650.

FIG. 6 provides a logical view of the receiver 120 and the devices included therein. It is not strictly necessary that each device be physically separate from other devices. Some or all devices may be combined in one physical module. Conversely, at least one device may be divided into physically separate modules.

Figure 7:
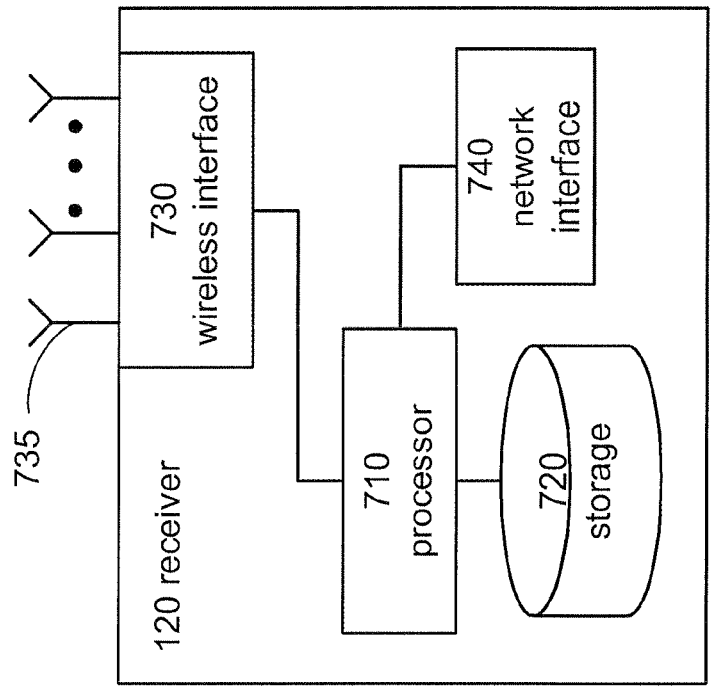
FIG. 7 illustrates another embodiment of a receiver of a wireless network structured to provide channel state information to a transmitter.

Also, the devices of the receiver 120 need not be implemented strictly in hardware. It is envisioned that the devices can be implemented through any combination of hardware and software. For example, as illustrated in FIG. 7, the receiver 120 may include one or more processors 710, one or more storage 720, and one or both of a wireless interface 730 and a network interface 740. The processor 710 may be structured to execute program instructions to perform the operations of one or more of the receiver devices. The instructions may be stored in a non-transitory storage medium or in firmware (e.g., ROM, RAM, Flash). Note that the program instructions may also be received through wired and/or or wireless transitory medium via one or both of the wireless and network interfaces 730, 740. The wireless interface 730 (e.g., a transceiver) may be structured to receive signals from and send signals to other radio network nodes via one or more antennas 735, which may be internal or external. The network interface 740 may be included and structured to communicate with other radio and/or core network nodes.

Figure 8:
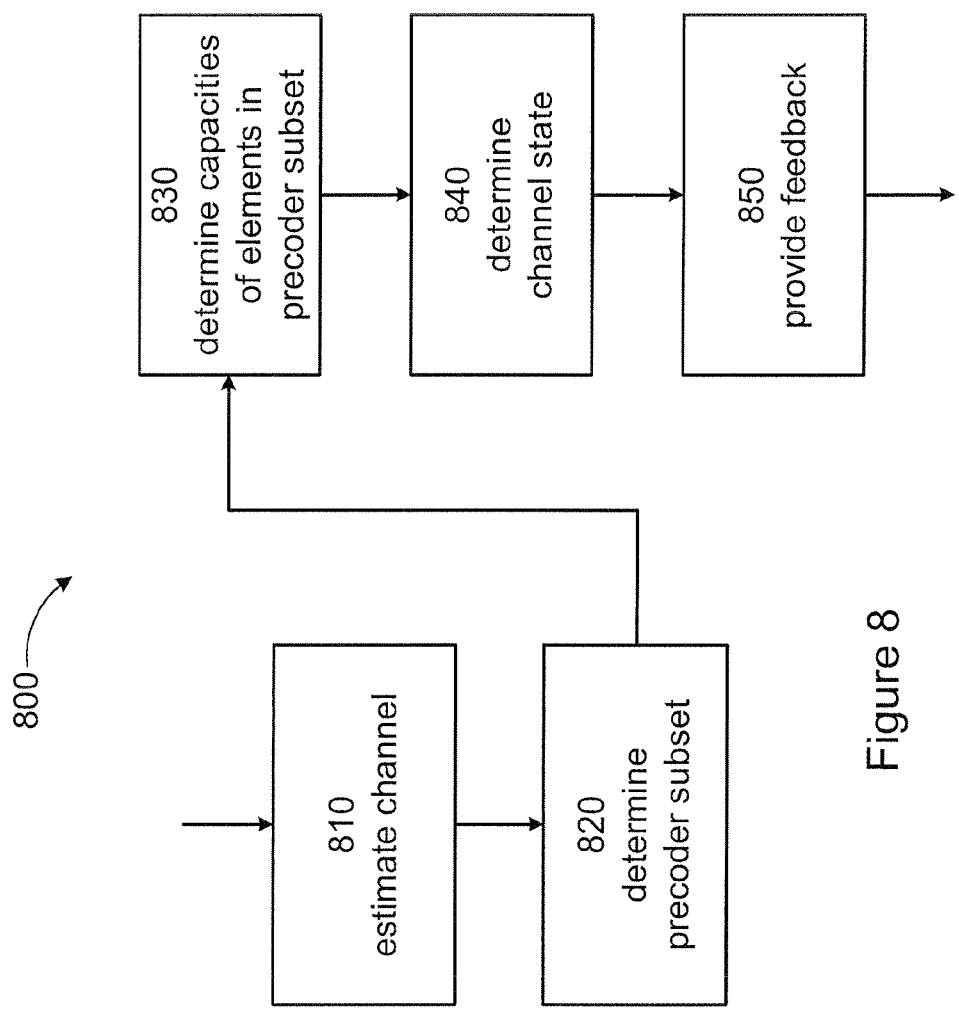
FIG. 8 illustrates a flow chart of an example method performed by a receiver to provide channel state information to a transmitter.

FIG. 8 illustrates a flow chart of an example method 800 performed by the receiver 120 to provide channel state information as feedback to the transmitter 110 in accordance with the proposed approach. In step 810, the channel estimator 610 may estimate the channel between the transmitter 110 and the receiver 120. For example, the transmitter 110 may transmit pilot symbols on a pilot channel such as CPICH which are received via the wireless interface 730 at the receiver 120. From these symbols, the channel estimator 610 may estimate the channel, and may also compute the channel coefficients.

In step 820, the precoder subset determiner 620 may determine the precoder subset. In this step, the precoder subset determiner 620 may select or otherwise choose which of the precoder elements of the codebook are included in the precoder subset. Note that not all precoder elements of the codebook are included in the subset, i.e., the search space should be reduced relative to that of the conventional exhaustive search. Thus, the precoder subset includes one or more precoder elements of the codebook, but less than all precoder elements of the codebook.

Figure 9:
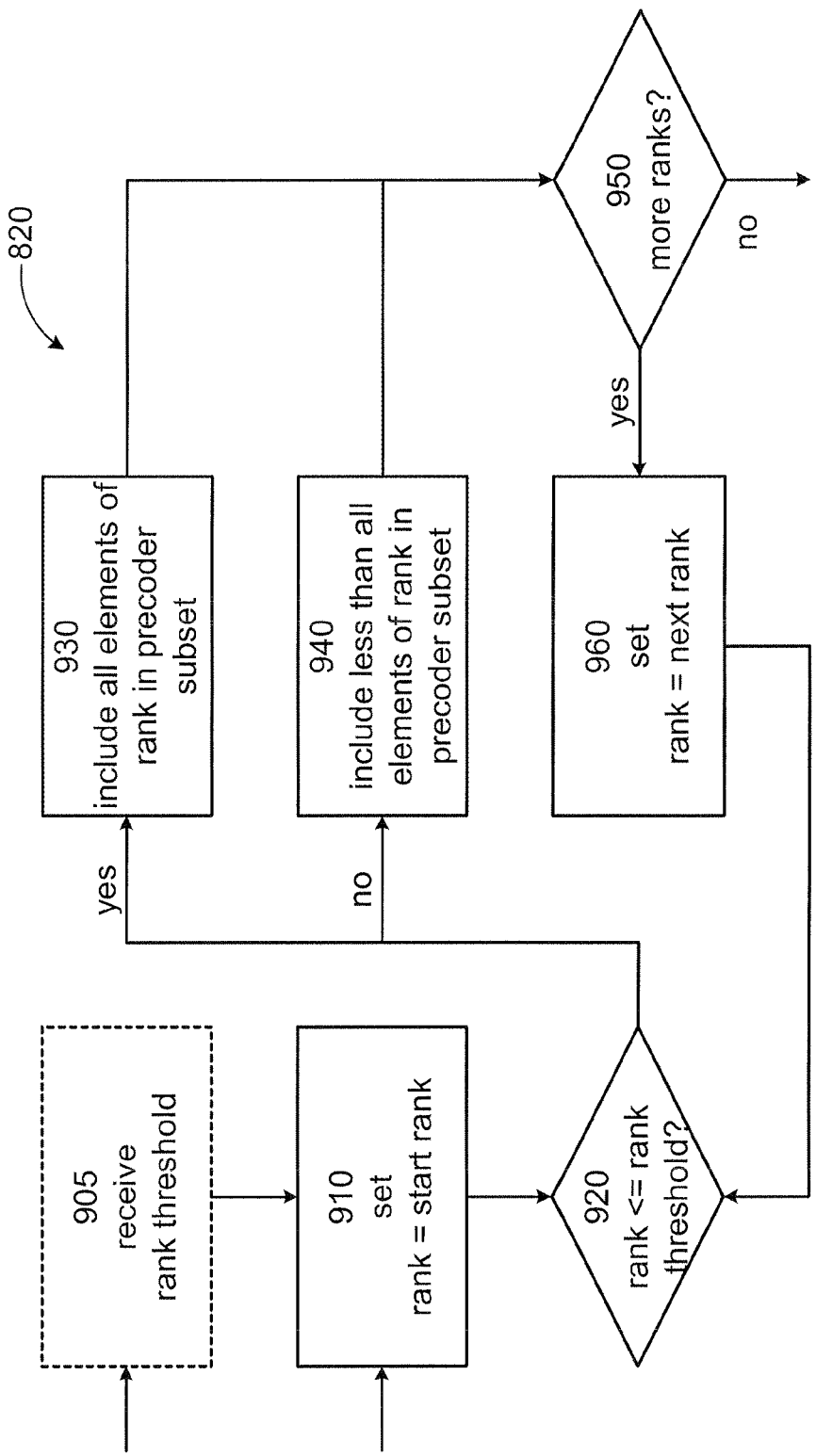
FIG. 9 illustrates a flow chart of an example process performed by a receiver to determine a precoder subset.

The precoder subset determiner 620 may determine the precoder subset in various ways. FIG. 9 illustrates a flow chart of an example process to implement step 820. In this example process, a similar procedure may be iterated through each of the plurality of ranks. The process may start at step 910 where the precoder subset determiner 620 initializes the rank to a start rank. For example, in the four branch MIMO system, the precoder subset determiner 620 may start at rank 1 (RI=1).

For each rank, in step 920, the precoder subset determiner 620 may determine whether or not the rank is at or above a rank threshold. In one aspect, the rank threshold may be internally defined within the receiver 120. Optionally, the precoder subset determiner 620 may receive the rank threshold from the transmitter 110 in step 905. When received, the received rank threshold may override any internally defined rank threshold and/or any previously received rank threshold.

If the rank is determined to be at or below the rank threshold, then in step 930, the precoder subset determiner 620 may include all precoder elements of that rank of the codebook in the precoder subset. For example, assume that for the four branch MIMO system, the rank threshold (internally defined or externally received) is set to 2. Then in step 930, the precoder subset determiner 620 may include all 16 precoder elements associated with rank 1 in the precoder subset. Similarly, all 16 precoder elements associated with rank 2 may be included.

However, if the rank is determined to be above the rank threshold, then in step 940, the precoder subset determiner 620 may include some precoder elements of that rank of the codebook in the precoder subset. However, not all precoder elements of that rank will be included. For example, again assume that the rank threshold is set to 2 for the four branch MIMO system. Then in step 940, the precoder subset determiner 620 may include any 8 of 16 precoder elements associated with rank 3 in the precoder subset, and may include any 2 of 16 precoder elements associated with rank 4. While not strictly required, for each rank above the rank threshold, it is preferred that at least one precoder elements of that rank be included in the precoder subset.

Note that for a given rank above the rank threshold, the precoder elements of that rank to be included in the precoder subset may be fixed, i.e., determined beforehand. For example, a list specifying the precoder elements of that rank to be included may be internally defined within the receiver 120. Alternatively, the list may be received from the transmitter 110. When received, the received list may override any internally defined list and/or any previously received list.

When the fixed list is specified, the precoder subset determiner 620 may choose the listed precoder elements of that rank to be included in the precoder subset in accordance with the fixed list in step 940. For example, for the four branch MIMO system, the list (defined internally and/or received from the transmitter 110) may indicate that precoder elements associated with PCI33-PCI40 for rank 3 and precoder elements associated with PCI49 and PCI50 for rank 4 are to be included in the precoder subset. Preferably, the number of the precoder elements of the rank included in the precoder subset is less than the total number of precoder elements of that rank.

But in another aspect, the precoder elements of the given rank need not be determined beforehand. In this instance, the precoder subset determiner 620 may randomly choose a number of precoder elements of that rank to be included in the precoder subset in step 940.

Of course, a combination is possible. That is, some of the precoder elements of the given rank may be fixed and some may be randomly chosen. For example, for rank 4, the precoder element associated with PCI49 may be fixed and the second precoder element may be randomly chosen.

Although some or all of the precoder elements themselves may be randomly chosen, the number of the precoder elements of the given rank included in the precoder subset may be fixed. That is, for each rank above the threshold, the number of precoder elements to be included may be defined internally and/or received from the transmitter 110. If the number is received from the transmitter 110, the received number may override the internally defined number and/or any previously received number. The number should be less than the total number of precoder elements in the codebook, i.e., n<N for each rank above the rank threshold. In some instances, the number could even be zero.

Note that all ranks above the rank threshold need not be commonly treated. That is, for one rank, there may be fixed list. But for another rank, the precoder elements may be chosen at random. For another rank still, some may be fixed and the rest may be chosen at random.

In an aspect, the precoder subset may include precoder elements of at least two ranks—first and second ranks—both of which are above the rank threshold and in which the first rank is lower than the second rank. When this occurs, the number of first rank precoder elements in the precoder subset may be greater than the number of second rank precoder elements. This reflects an application of the observation that as the rank increases, similar performance loss does not become noticeable until the number of elements is decreased to a greater degree. Thus, lesser number of precoder elements can be considered for higher ranks. For example, recall that for rank 3 transmission in the example four branch MIMO system, a performance loss of about 2% was noticed when the number of elements was halved to n=8 (see FIG. 3). But for rank 4 transmissions, the number of elements was reduced to n=2 before a similar 2% performance loss was noticed (see FIG. 4).

The first and second ranks need not always be consecutive. Also, note that the number of first rank precoder elements need not always be greater than the number of second rank precoder elements, i.e., they may be equal. Then more generally, it can be said that the number of first rank precoder elements may be equal to or greater than the number of second rank precoder elements.

FIG. 9 illustrates a scenario in which the receiver 120 performs the bulk of the legwork to determine the precoder subset. While not illustrated, the transmitter 110 itself may specify the precoder elements of each rank to be included in the precoder subset, regardless of whether or not the rank is above, at, or below the rank threshold. For example, the transmitter 110 may not have the capacity to transmit with certain RI/PCI combination. In this case, there is no need for the receiver 120 to even consider the associated precoder element. Thus, in another aspect, the precoder subset determiner 620 may simply receive the precoder subset from the transmitter 110 in step 940. Alternatively, the precoder subset determiner 620 may receive one or more criteria for inclusion (e.g., the transmitter 110 may specify that precoder elements associated with 16QAM modulation be considered) or exclusion (e.g., the transmitter 110 may specify that it cannot handle certain combinations of PCI and RI) or both.

Of course, variations and combinations are contemplated to be within the scope of this disclosure. For example, the precoder subset determiner 620 may receive a list of precoder elements to be excluded (or criteria for exclusion) from the precoder subset. Then the method 900 illustrated in FIG. 9 may be performed for the remaining precoder elements of the codebook.

Figure 10:
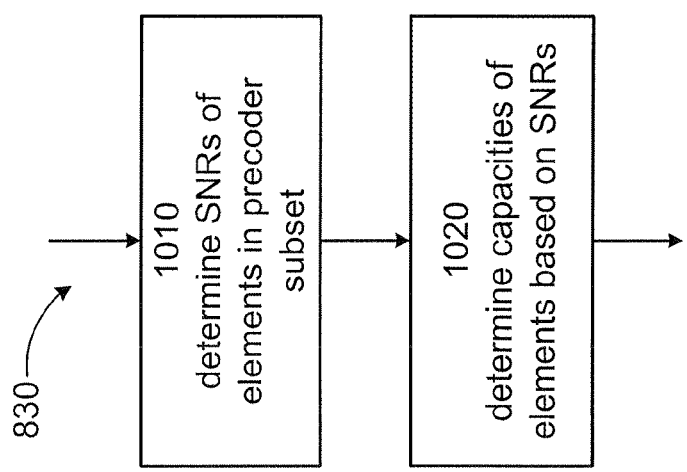
FIG. 10 illustrates a flow chart of an example process performed by a receiver to determine capacities of precoder elements.

Referring back to FIG. 8, after the precoder subset has been determined, the capacity corresponding each precoder element for all precoder elements in the precoder subset may be determined in step 830. FIG. 10 illustrates a flow chart of an example process that may be performed to implement step 830. In step 1010, the capacity determiner 630 may determine the SNRs associated with each precoder element in the precoder subset. The SNRs associated each precoder element may be determined based on the channel estimations made by the channel estimator 610. Note that SNR should be viewed in a general sense to include other expressions that conceptualizes the presence of desirable and undesirable signals such as SIR and SINR.

In step 1020, the capacity determiner 630 may determine the capacity corresponding to each precoder element based on the associated SNR. For example, the capacity C may be computed using the formula $C=B \log_2(1+SNR)$ for each precoder element.

Again referring back to FIG. 8, after the capacities of the corresponding precoder elements in the subset are determined, then in step 840, the channel state determiner 640 may determine the channel state information associated with the precoder element whose corresponding capacity is maximum among the determined capacities of the precoder subset. The feedback provider 650 in step 850 may provide the channel state information to the transmitter 110.

Figure 11:
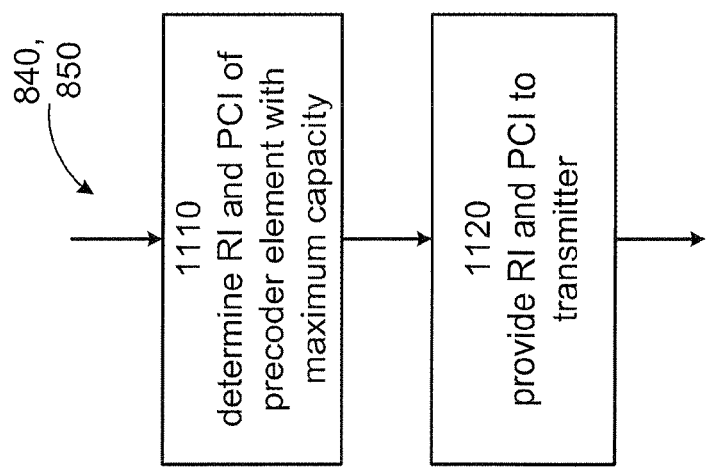
FIG. 11 illustrates an example process performed by a receiver to determine a channel state and provide feedback to a transmitter.

A flow chart of an example process to implement the steps 840 and 850 is illustrated FIG. 11. In step 1110, the channel state determiner 640 may determine the CSI of the precoder element with the maximum capacity. The CSI may include rank information (RI) and precoder control index (PCI). The CSI may also include channel quality information (CQI). In step 1120, the feedback provider 650 may provide the RI and PCI, among other information, to the transmitter 110.

Note that maximizing the capacity is not the only selection criteria. Instead of or in addition to capacity, throughputs, spectral efficiency, sum capacity of the precoder elements may be determined, maximized, and reported as feedback in steps 830, 840, and 850.

Figure 12:
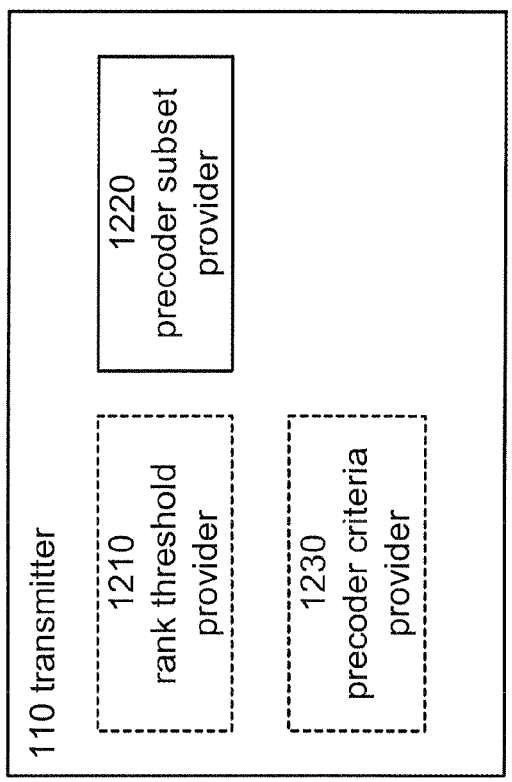
FIG. 12 illustrates an embodiment of a transmitter of a wireless network structured to provide a precoder subset to a receiver.

Recall from above that the transmitter 110 may provide the precoder subset to the receiver 120. FIG. 12 illustrates an embodiment of a transmitter 110 of a multi-antenna wireless network 100 that is structured to provide the precoder subset. As seen, the transmitter 110 may a precoder subset provider 1220. Optionally, the transmitter 110 may also include one or both of a rank threshold provider 1210 and a precoder criteria provider. FIG. 12 provides a logical view of the transmitter 110 and the devices included therein. It is not strictly necessary that each device be physically separate from other devices. Some or all devices may be combined in one physical module. Conversely, at least one device may be divided into physically separate modules.

Figure 13:
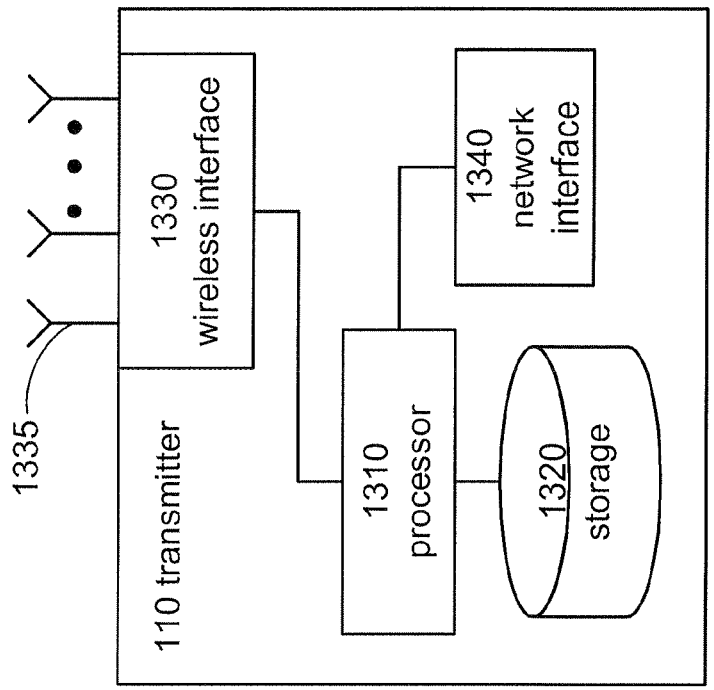
FIG. 13 illustrates another embodiment of a transmitter of a wireless network structured to provide a precoder subset to a receiver.

Also, the devices of the transmitter 110 need not be implemented strictly in hardware. It is envisioned that the devices can be implemented through any combination of hardware and software. For example, as illustrated in FIG. 13, the transmitter 110 may include one or more processors 1310, one or more storage 1320, and one or both of a wireless interface 1330 and a network interface 1340. The processor 1310 may be structured to execute program instructions to perform the operations of one or more of the receiver devices. The instructions may be stored in a non-transitory storage medium or in firmware (e.g., ROM, RAM, Flash). Note that the program instructions may also be received through wired and/or or wireless transitory medium via one or both of the wireless and network interfaces 1330, 1340. The wireless interface 1330 may be structured to receive signals from and send signals to other radio network nodes via one or more antennas 1335, which may be internal or external. The network interface 1340 may be included and structured to communicate with other radio and/or core network nodes.

Figures 14, 15:
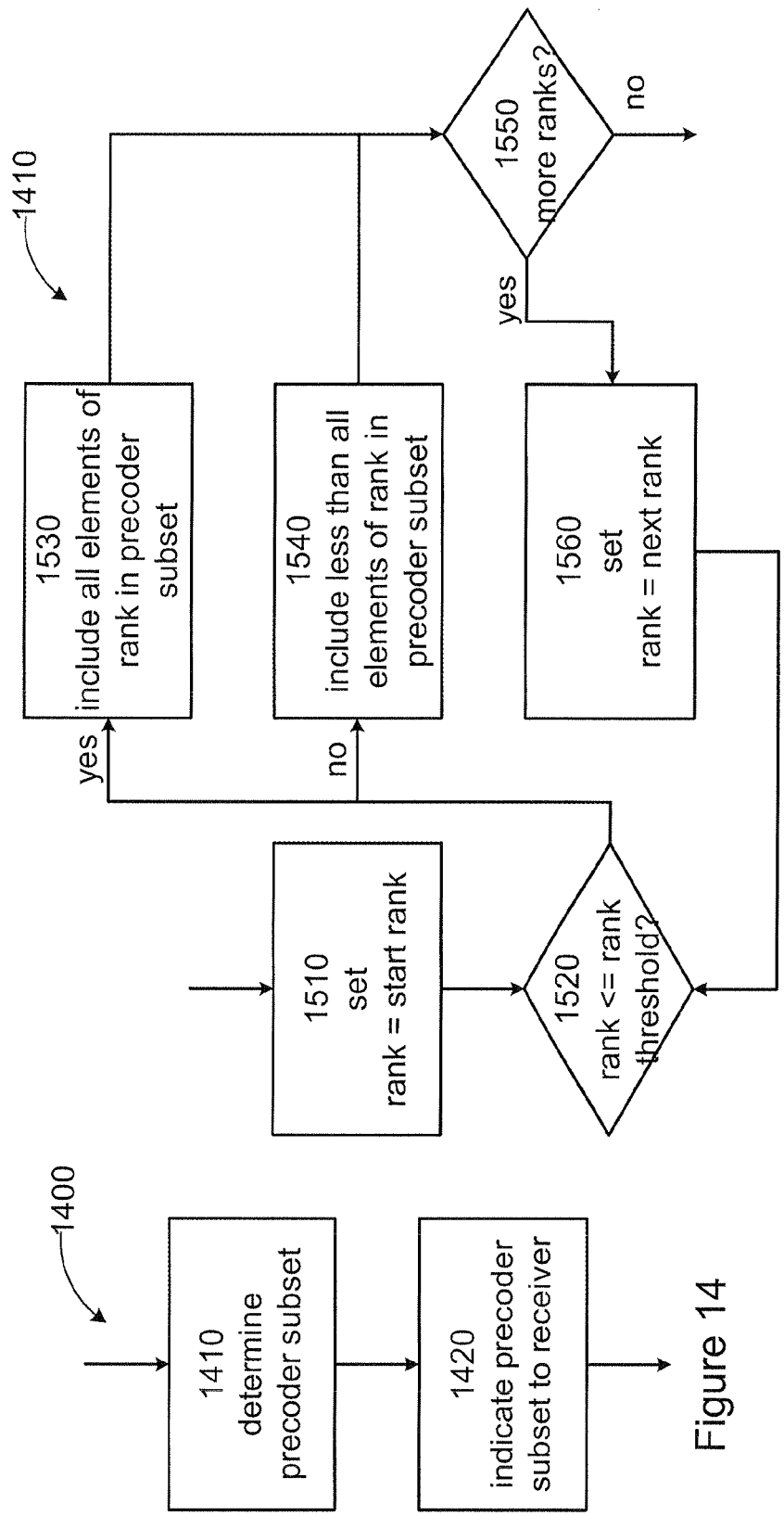
FIG. 14 illustrates a flow chart of an example method performed by a transmitter to provide a precoder subset to a receiver.
FIG. 15 illustrates a flow chart of an example process performed by a transmitter to determine a precoder subset.

FIG. 14 illustrates a flow chart of an example method 1400 performed by the transmitter 110 to provide the precoder subset to the receiver 120. In step 1410, the precoder subset provider 1220 may determine the precoder subset. In this step, the precoder subset provider 1220 may select or otherwise choose which of the precoder elements of the codebook are included in the precoder subset. Thus, the precoder subset includes one or more precoder elements of the codebook, but less than all precoder elements of the codebook. A flow chart of an example process to implement step 1410 is illustrated in FIG. 15. As seen, the precoder subset provider 1220 may iterate through steps 1510-1560 for each of the plurality of ranks to determine the precoder subset. These steps are similar to the steps 910-960 illustrated in FIG. 9. Thus, the detailed descriptions of steps 1510-1560 will be omitted for simplicity.

Although not a strict requirement, for each rank above the rank threshold, it is preferred that at least one precoder elements of that rank be included in the precoder subset. The precoder elements of that rank to be included in the precoder subset may be fixed, may be randomly chosen, or may be chosen based on some criteria such as system load, receiver location, statistics (e.g., previous experience indicating that certain precoder elements provide better performance), and so on. Of course, any combination of these is possible (some fixed, others chosen randomly and/or based on criteria).

Referring back to FIG. 14, the method 1400 also includes step 1420 in which the precoder subset provider 1220 wirelessly provides the precoder subset to the receiver 120. In this step, it is intended that the phrase "provide" be interpreted broadly as providing any information that is sufficient to allow the receiver 120 to determine the composition of the precoder subset. For example, in one embodiment, the information may comprise indices of the precoder elements that are included in the precoder subset. In another embodiment, the information may be comprise indices of those precoder elements that are excluded from consideration, which is advantageous when the number of excluded elements is small and the number of included elements is large. In yet another embodiment, the information may be in a form of a bitwise mask in which each bit position of the mask corresponds to a particular precoder element of the codebook, and the bit value indicates whether or not the corresponding precoder element is included in the precoder subset. These are simply some examples of the ways in which the precoder subset can be communicated, and are not meant to be exhaustive.

While not illustrated, when the precoder subset is determined by the receiver 120 (e.g., by performing the steps of FIG. 9), the rank threshold provider 1210 may provide the rank threshold to the receiver 120. Alternatively or in addition, the precoder criteria provider 1230 may provide one or more criteria for inclusion and/or exclusion to the receiver 120.

There are many advantages associated with one or more aspects of the disclosed subject matter. A non-exhaustive list of advantages include:

Simple to implement;
Easily extended to greater number of antennas (e.g., eight) with large codebook sizes (the advantages become greater);
Does not require any standards change.

Although the description above contains many specificities, these should not be construed as limiting the scope of the disclosed subject matter but as merely providing illustrations of some of the presently preferred embodiments. Therefore, it will be appreciated that the scope of the disclosed subject matter fully encompasses other embodiments, and that the scope is accordingly not to be limited. All structural, and functional equivalents to the elements of the above-described preferred embodiment that are known to those of ordinary skill in the art are expressly incorporated herein by reference and are intended to be encompassed hereby. Moreover, it is not necessary for a device or method to address each and every problem described herein or sought to be solved by the present technology, for it to be encompassed hereby.

What is claimed is:

1. A method performed by a transmitter to provide a precoder subset to a receiver in a multi-antenna wireless communication system, the method comprising:
    determining the precoder subset comprising one or more precoder elements, each precoder element being a precoder element of a codebook, and the precoder subset including less than all precoder elements of the codebook wherein determining the precoder subset comprises for each rank, determining whether that rank is at or below a rank threshold;
    for each rank at or below the rank threshold, including all precoder elements of that rank of the codebook in the precoder subset;
    for each rank above the rank threshold, including less than all precoder elements of that rank of the codebook in the precoder subset; and
    providing the precoder subset to the receiver,
    wherein the codebook is defined for a plurality of ranks, and
    wherein for each rank, the codebook comprises a plurality of precoder elements corresponding to that rank.

2. The method of claim 1, wherein for at least one rank above the rank threshold, the step of including less than all precoder elements of that rank comprises choosing the precoder elements, which are fixed, of that rank to be included in the precoder subset.

3. The method of claim 1, wherein for at least one rank above the rank threshold, the step of including less than all precoder elements of that rank comprises randomly choosing the precoder elements of that rank to be included in the precoder subset.

4. The method of claim 1,
    wherein the precoder subset includes precoder elements of at least first and second ranks, both ranks being greater than the rank threshold, and the first rank being lower than the second rank, and
    wherein in the precoder subset, a number of precoder elements of the first rank is equal to or greater than a number of precoder elements of the second rank.

5. A transmitter of a multi-antenna wireless communication system, the transmitter structured to provide a precoder subset to a receiver, the transmitter comprising:
    a precoder subset provider structured to determine the precoder subset comprising one or more precoder elements, each precoder element being a precoder element of a codebook, and the precoder subset including less than all precoder elements of the codebook wherein the precoder subset provider is structured to:
    for each rank, determine whether that rank is at or below a rank threshold,
    for each rank at or below the rank threshold, include all precoder elements of that rank of the codebook in the precoder subset, and
    for each rank above the rank threshold, include less than all precoder elements of that rank of the codebook in the precoder subset, and
    the precoder subset provider also being structured to provide the precoder subset to the receiver,
    wherein the codebook is defined for a plurality of ranks, and
    wherein for each rank, the codebook comprises a plurality of precoder elements corresponding to that rank.

6. The transmitter of claim 5, wherein for at least one rank above the rank threshold, the precoder subset provider is structured to choose the precoder elements, which are fixed, of that rank to be included in the precoder subset.

7. The transmitter of claim 5, wherein for at least one rank above the rank threshold, the precoder subset provider is structured to randomly choose the precoder elements of that rank to be included in the precoder subset.

8. The transmitter of claim 5,
wherein the precoder subset includes precoder elements of at least first and second ranks, both ranks being greater than the rank threshold, and the first rank being lower than the second rank, and
wherein the precoder subset provider is structured to include a number precoder elements of the first rank that is equal to or greater than a number of precoder elements of the second rank in the precoder subset.

9. A non-transitory computer-readable medium which includes therein programming instructions such that when a computer executes the programming instructions in a transmitter to provide a precoder subset to a receiver in a multi-antenna wireless communication system, the programming instructions, when executed by the computer configured to:
determine the precoder subset comprising one or more precoder elements, each precoder element being a precoder element of a codebook, and the precoder subset including less than all precoder elements of the codebook wherein:
for each rank, determine whether that rank is at or below a rank threshold,
for each rank at or below the rank threshold, include all precoder elements of that rank of the codebook in the precoder subset, and
for each rank above the rank threshold, include less than all precoder elements of that rank of the codebook in the precoder subset; and
provide the precoder subset to the receiver,
wherein the codebook is defined for a plurality of ranks, and
wherein for each rank, the codebook comprises a plurality of precoder elements corresponding to that rank.

10. The non-transitory computer-readable medium of claim 9, wherein for at least one rank above the rank threshold, the precoder subset provider is structured to choose the precoder elements, which are fixed, of that rank to be included in the precoder subset.

11. The non-transitory computer-readable medium of claim 9, wherein for at least one rank above the rank threshold, the precoder subset provider is structured to randomly choose the precoder elements of that rank to be included in the precoder subset.

12. The non-transitory computer-readable medium of claim 9,
wherein the precoder subset includes precoder elements of at least first and second ranks, both ranks being greater than the rank threshold, and the first rank being lower than the second rank, and
wherein the precoder subset provider is structured to include a number precoder elements of the first rank that is equal to or greater than a number of precoder elements of the second rank in the precoder subset.

\* \* \* \* \*